United States Patent
Enders et al.

(10) Patent No.: US 12,043,117 B2
(45) Date of Patent: Jul. 23, 2024

(54) METHOD FOR A POWERTRAIN AND HYBRID MODULE IN A POWERTRAIN

(71) Applicant: Schaeffler Technologies AG & Co. KG, Herzogenaurach (DE)

(72) Inventors: Timo Enders, Bensheim (DE); Ralf Mannsperger, Renchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 431 days.

(21) Appl. No.: 17/287,129

(22) PCT Filed: Oct. 10, 2019

(86) PCT No.: PCT/DE2019/100877
§ 371 (c)(1),
(2) Date: Apr. 21, 2021

(87) PCT Pub. No.: WO2020/088711
PCT Pub. Date: May 7, 2020

(65) Prior Publication Data
US 2021/0387521 A1 Dec. 16, 2021

(30) Foreign Application Priority Data
Oct. 29, 2018 (DE) ...................... 10 2018 126 881.5

(51) Int. Cl.
*B60K 6/48* (2007.10)
*B60K 6/26* (2007.10)
(Continued)

(52) U.S. Cl.
CPC ................ *B60K 6/485* (2013.01); *B60K 6/26* (2013.01); *B60K 6/387* (2013.01); *B60K 6/442* (2013.01);
(Continued)

(58) Field of Classification Search
CPC .......... B60K 6/485; B60K 6/26; B60K 6/387; B60K 6/442; B60W 10/06; B60W 10/08; B60W 20/19; B60W 20/20; B60W 20/40; B60W 2510/0642; B60W 2520/10; B60W 2540/103; B60W 2540/106;
(Continued)

(56) References Cited

U.S. PATENT DOCUMENTS

| 2009/0009333 A1 | 4/2009 | Soliman et al. |
| 2009/0093337 A1 | 4/2009 | Soliman |

(Continued)

FOREIGN PATENT DOCUMENTS

| CN | 102481920 A | 5/2012 |
| CN | 103003561 A | 3/2013 |

(Continued)

*Primary Examiner* — Michael V Kerrigan

(57) ABSTRACT

In a method for operating a powertrain of a vehicle, a first electric motor can provide a first drive torque, a second electric motor can provide a second drive torque and an internal combustion engine can provide a third drive torque to an output. The internal combustion engine and the first electric motor can be connected to the output via a separating clutch. In the event of a specific acceleration requirement, the separating clutch is closed regardless of a state of the internal combustion engine, and the first electric motor delivers the first drive torque and the second electric motor delivers the second drive torque together to the output.

12 Claims, 2 Drawing Sheets

(51) Int. Cl.
*B60K 6/387* (2007.10)
*B60K 6/442* (2007.10)
*B60K 6/485* (2007.10)
*B60W 10/06* (2006.01)
*B60W 10/08* (2006.01)
*B60W 20/19* (2016.01)
*B60W 20/20* (2016.01)
*B60W 20/40* (2016.01)

(52) U.S. Cl.
CPC ............ *B60W 10/06* (2013.01); *B60W 10/08* (2013.01); *B60W 20/19* (2016.01); *B60W 20/20* (2013.01); *B60W 20/40* (2013.01); *B60W 2510/0642* (2013.01); *B60W 2520/10* (2013.01); *B60W 2540/103* (2013.01); *B60W 2540/106* (2013.01)

(58) Field of Classification Search
CPC ... B60W 2540/10; B60W 10/02; Y02T 10/62; B60Y 2200/92
See application file for complete search history.

(56) References Cited

U.S. PATENT DOCUMENTS

2012/0116629 A1   5/2012   Kamoshida et al.
2013/0131941 A1   5/2013   Kitahata et al.

FOREIGN PATENT DOCUMENTS

| | | |
|---|---|---|
| CN | 104837702 A | 8/2015 |
| DE | 10246839 A1 | 4/2004 |
| DE | 102010019537 A1 | 12/2010 |
| DE | 102017222126 A1 | 6/2018 |
| DE | 102018204389 A1 | 10/2018 |
| EP | 1932704 A2 | 6/2008 |
| EP | 2199579 A2 | 6/2010 |
| GB | 2508665 A | 6/2014 |
| KR | 20010085791 A | 9/2001 |
| KR | 20130058993 A | 6/2013 |
| KR | 20150086317 A | 7/2015 |
| WO | 2012118506 A1 | 9/2012 |
| WO | WO2011021517 A1 | 1/2013 |
| WO | WO2011145221 A1 | 7/2013 |

METHOD FOR A POWERTRAIN AND HYBRID MODULE IN A POWERTRAIN

CROSS-REFERENCE TO RELATED APPLICATIONS

This application is the U.S. National Phase of PCT Appln. No. PCT/DE2019/100877 filed Oct. 10, 2019, which claims priority to DE 102018126881.5 filed Oct. 29, 2018, the entire disclosures of which are incorporated by reference herein.

TECHNICAL FIELD

The disclosure relates to a method for operating a powertrain of a vehicle.

BACKGROUND

A powertrain in a vehicle is known from DE 102 46 839 A1, for example. A first and a second electric motor are used between an internal combustion engine and an output. A clutch is arranged between the internal combustion engine and the output. At low vehicle speeds, the vehicle is only driven by the second electric motor, since otherwise the internal combustion engine's speed would be too low.

SUMMARY

It is desirable to improve a powertrain of a vehicle.

A method for operating a powertrain of a vehicle is proposed, wherein a first electric motor can provide a first drive torque, a second electric motor can provide a second drive torque and an internal combustion engine can provide a third drive torque to an output, and the internal combustion engine and the first electric motor can be connected to the output via a separating clutch, wherein, in the event of a specific acceleration requirement, the separating clutch is closed regardless of a state of the internal combustion engine, and the first electric motor delivers the first drive torque and the second electric motor delivers the second drive torque together to the output.

This allows the vehicle's powertrain to operate better. The powertrain can be improved. The vehicle can have a higher acceleration and acceleration processes, for example overtaking processes with the vehicle, can be carried out more quickly. The responsiveness of the vehicle can be improved.

The separating clutch can be closed immediately in the event of a specific acceleration requirement.

The first, second or third drive torque can be independently provided to the output and thereby drive the vehicle. The first, second or third drive torque can be greater than the torque required to move the vehicle.

The first electric motor can be connected to the internal combustion engine. A rotor of the electric motor can be connected to the crankshaft of the internal combustion engine. The first electric motor can be arranged on a side of the internal combustion engine on which the separating clutch is arranged.

The first drive torque can act on a clutch input of the separating clutch.

The first electric motor, the second electric motor and the internal combustion engine may be connected in series and the separating clutch may be effectively arranged between the second electric motor and the internal combustion engine. The first electric motor can be connected together with the internal combustion engine to a clutch input of the separating clutch and the second electric motor can be connected to a clutch output of the separating clutch.

The internal combustion engine may rotate at a first speed when at least the first electric motor provides the first drive torque.

If the first speed is below an idling speed of the internal combustion engine, the internal combustion engine may run freely and be dragged along. If the first speed is equal to an idling speed of the internal combustion engine or is above the idling speed of the internal combustion engine, the third drive torque may also be delivered to the output in addition to the first and second drive torque.

The first speed can correlate with the driving speed. The connection of the internal combustion engine to deliver the third drive torque to the output can take place as a function of a driving speed. For example, the driving speed corresponding to the idling speed can be approximately 50 km/h.

In the event of the specific acceleration requirement, the separating clutch can be closed independently of the first speed in relation to the idling speed of the internal combustion engine. In the event of the specific acceleration requirement, the separating clutch can be closed independently of the vehicle speed in relation to the idling speed of the internal combustion engine.

The acceleration requirement may occur when a first parameter is reached or exceeded. The first parameter can be a specific accelerator pedal gradient or a specific accelerator pedal position. The determination via the first parameter can enable an intention of the driver of the vehicle to be recognized. For example, kick-down conditions can trigger the acceleration requirement.

The acceleration requirement may occur when, in addition to the first parameter, a second parameter is reached or exceeded. The second parameter can be a vehicle speed. The second parameter can be reached when the vehicle is stationary. If the first parameter is then also reached or exceeded, the acceleration requirement can be triggered.

The method may be used with at least one of the aforementioned features in a hybrid module in a powertrain of a vehicle.

The hybrid module can have the first and/or second electric motor and the separating clutch.

BRIEF DESCRIPTION OF THE DRAWINGS

Further advantages and advantageous embodiments result from the description of the figures and the drawings.

The method and hybrid module are described in detail below with reference to the drawings, wherein.

DETAILED DESCRIPTION

Figure 1:
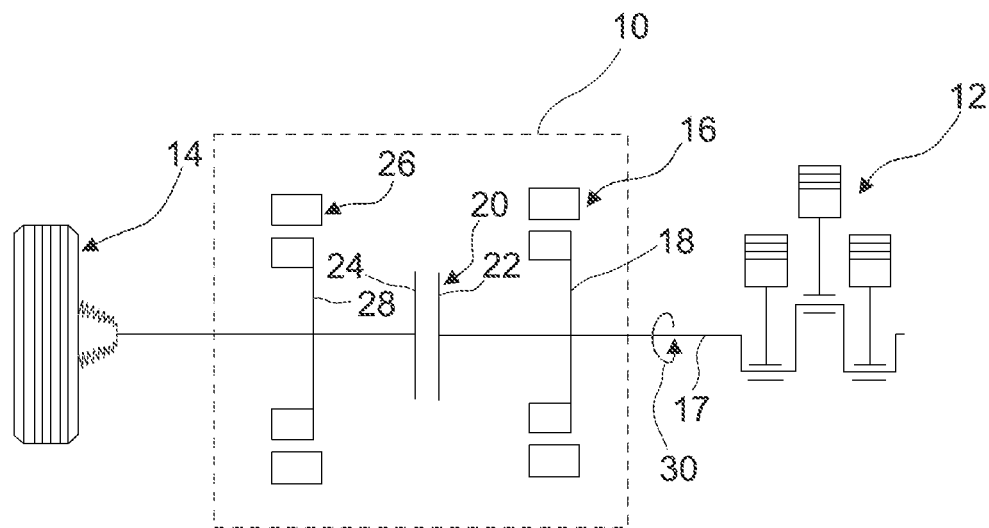
FIG. 1: shows a powertrain of a vehicle with a hybrid module.

FIG. 1 shows a powertrain of a vehicle with a hybrid module 10. The hybrid module 10 is arranged between an internal combustion engine 12 and an output 14, which is formed in particular by vehicle wheels. The hybrid module 10 has a first electric motor 16, which can provide a first drive torque and which is connected to the internal combustion engine 12, which can provide a third drive torque. A crankshaft 17 of the internal combustion engine 12 can be connected to a rotor 18 of the first electric motor 16 in a rotationally fixed manner.

The first electric motor 16 and the internal combustion engine 12 can be connected together to the output 14 via a separating clutch 20. The first electric motor 16 and the internal combustion engine 12 are connected to a clutch input 22 of the separating clutch 20. When the separating clutch 20 is closed, the first electric motor 16 can transmit the first drive torque and the internal combustion engine 12 can transmit the third drive torque to the output 14 together.

A second electric motor 26, which provides a second drive torque, is connected to a clutch output 24 of the separating clutch 20. The second electric motor 26 has a rotor 28 which is non-rotatably connected to the clutch output 24 and is also connected to the output 14.

The first electric motor 16, the second electric motor 26 and the internal combustion engine 12 are connected in series and the separating clutch 20 is operatively arranged between the second electric motor 26 and the internal combustion engine 12 as well as between the second electric motor 26 and the first electric motor 16.

If the separating clutch 20 is closed, the first electric motor 16 can deliver the first drive torque and the second electric motor 26 can deliver the second drive torque to the output 14. Whether the internal combustion engine 12 provides the third drive torque and also delivers it to the output 14 when the separating clutch 20 is closed depends on the rotational speed of the internal combustion engine 12.

When at least the first electric motor 16 provides the first drive torque, the internal combustion engine 12 rotates at a first speed 30. If the first speed 30 is below an idling speed of the internal combustion engine 12, the internal combustion engine 12 runs freely and is dragged along. There is a drag torque of the internal combustion engine 12, which counteracts the first drive torque. The drag torque can be, for example, 20 to 40 Nm.

When the first speed 30 corresponds to or is above an idling speed of the internal combustion engine 12, the internal combustion engine 12 is actively operated and provides the third drive torque. The third drive torque adds up together with the first drive torque and, if the second electric motor 26 is also operated, with the second drive torque to a total drive torque that is present at the output 14 for driving the vehicle when the separating clutch 20 is closed.

Figure 2:
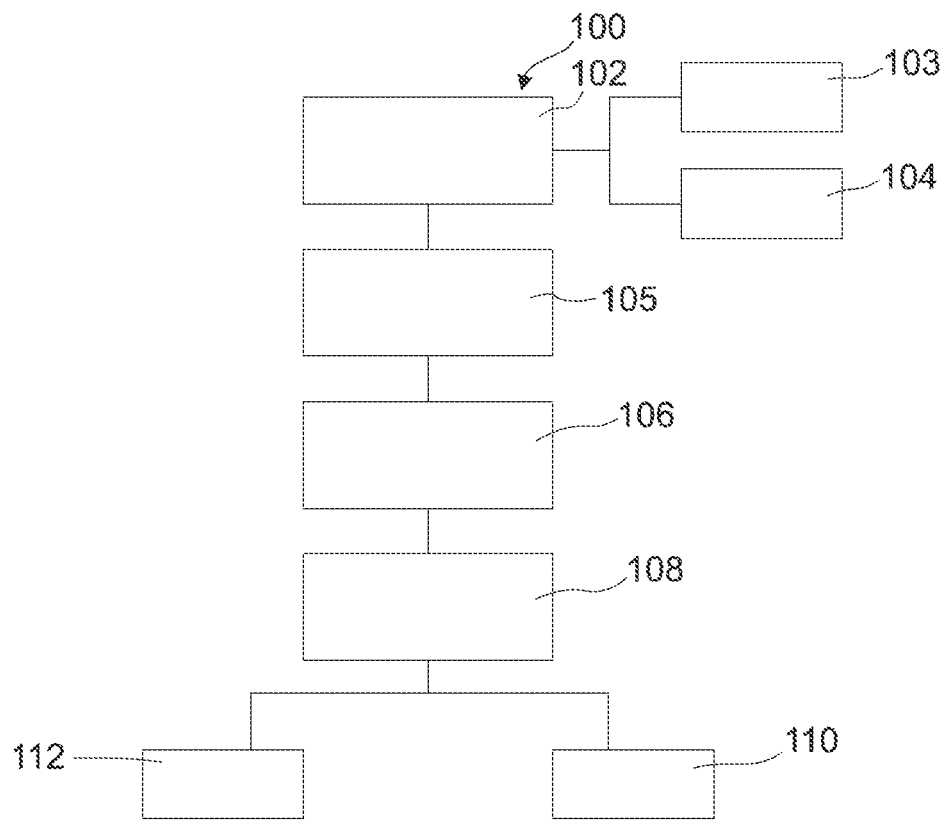
FIG. 2: shows a method for operating a powertrain of a vehicle.

FIG. 2 shows a method 100 for operating a powertrain of a vehicle. The powertrain has a first electric motor that can provide a first drive torque and a second electric motor that can provide a second drive torque. Furthermore, the powertrain has an internal combustion engine that can provide a third drive torque. The first, second and third drive torque can be provided together to an output.

The internal combustion engine and the first electric motor can be connected to the output via a separating clutch. The second electric motor is firmly connected to the output.

In the method, a query 102 first takes place as to whether a specific acceleration requirement is present. The acceleration requirement occurs when a first parameter 103 is reached or exceeded. The first parameter 103 can be a specific accelerator pedal gradient or a specific accelerator pedal position. It can be provided that the acceleration requirement is present when, in addition to the first parameter 103, a second parameter 104 is reached or exceeded. The second parameter can be a vehicle speed. For example, the acceleration requirement can at least only be present when the vehicle is stationary.

In the event of the acceleration requirement, the separating clutch is closed 105 regardless of a state of the internal combustion engine, in particular regardless of whether the internal combustion engine is currently switched off or is being actively operated. As a result, the first drive torque can be delivered 106 by the first electric motor and the second drive torque can be delivered by the second electric motor together to the output.

When at least the first electric motor provides the first drive torque, the internal combustion engine rotates at a first speed. There is a check 108 as to whether the first speed is below a predetermined idling speed of the internal combustion engine. If this is the case, then the internal combustion engine runs freely and is dragged along 110.

If the check 108 shows that the first speed is equal to the idling speed of the internal combustion engine or is above the idling speed of the internal combustion engine, the internal combustion engine also delivers 112 the third drive torque to the output in addition to the first and second drive torque.

The first speed can correlate with the driving speed. The connection of the internal combustion engine to deliver the third drive torque to the output can preferably take place as a function of a driving speed. For example, the driving speed corresponding to the idling speed can be approximately 50 km/h.

Figure 3:
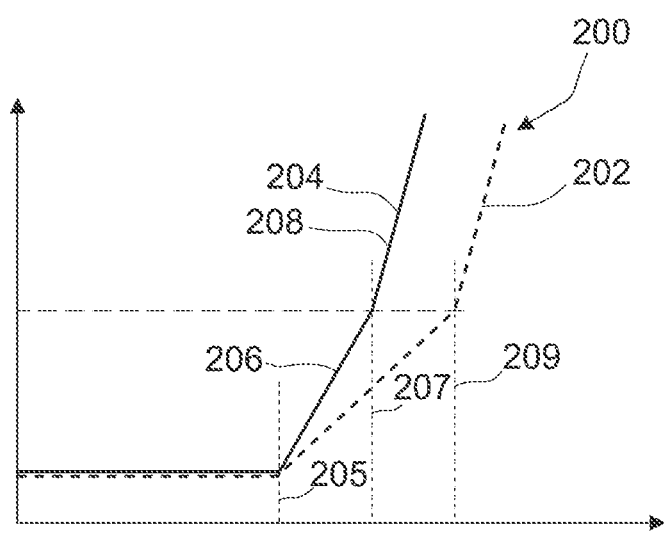
FIG. 3: shows an acceleration diagram of a vehicle when applying a method.

FIG. 3 shows an acceleration diagram 200 of a vehicle when applying a method. The acceleration diagram 200 illustrates the time course of an acceleration torque at the output. The curve profile 202 indicates the time profile of the acceleration torque at the output of a powertrain of the vehicle in which the method is not used.

The curve profile 204 indicates the time profile of the acceleration torque at the output of the powertrain of the vehicle, for example at the vehicle wheels, when the method is used. When the acceleration requirement is fulfilled, which takes place at the time point 205, the separating clutch is closed and from then on the first electric motor accelerates the vehicle with the first drive torque and the second electric motor with the second drive torque, illustrated here by the curve section 206.

The third drive torque of the internal combustion engine is available from the time point 207, because then the first speed has reached the idling speed of the internal combustion engine and the internal combustion engine can be actively operated and deliver the third drive torque, together with the first and second drive torque, to the output according to the curve section 208 shown here.

In comparison to this, the acceleration torque at the output is shown over time by the curve profile 202 without using the method. The separating clutch is only closed when the internal combustion engine has reached idling speed, which takes place here at the time point 209. Only then can the first electric motor deliver the respective drive torque to the output in addition to the second electric motor.

However, when using the method the acceleration torque can, be provided earlier and more strongly to the output. This enables the vehicle to be accelerated more strongly.

LIST OF REFERENCE SYMBOLS

10 Hybrid module
12 Internal combustion engine
14 Output
16 First electric motor
17 Crankshaft
18 Rotor 20 Separating clutch
22 Clutch input
24 Clutch output
26 Second electric motor
28 Rotor
30 Speed
100 Method
102 Query
103 First parameter
104 Second parameter
105 Closing of the separating clutch
106 Delivery to the output
108 Check
110 Carrying along the internal combustion engine
112 Delivery to the output
200 Acceleration diagram
202 Course of the curve
204 Course of the curve
205 Time point
206 Curve segment
207 Time point
208 Curve segment
209 Time point

The invention claimed is:

1. A method for operating a powertrain of a vehicle, wherein a first electric motor can provide a first drive torque, a second electric motor can provide a second drive torque and an internal combustion engine can provide a third drive torque to an output, and the internal combustion engine and the first electric motor can be connected to the output via a separating clutch wherein, in the event of a specific acceleration requirement, the separating clutch is closed regardless of a state of the internal combustion engine, and the first electric motor delivers the first drive torque and the second electric motor delivers the second drive torque together to the output, wherein the acceleration requirement is present when a vehicle speed is reached or exceeded and when a further vehicle parameter is reached or exceeded.

2. The method according to claim 1, wherein the first electric motor, the second electric motor and the internal combustion engine are connected in series and the separating clutch is operatively arranged between the second electric motor and the internal combustion engine.

3. The method according to claim 1, wherein, when at least the first electric motor provides the first drive torque, the internal combustion engine rotates at a first speed.

4. The method according to claim 3, wherein, when the first speed is below an idling speed of the internal combustion engine, the internal combustion engine runs freely and is dragged along.

5. The method according to claim 3, wherein, when the first speed is equal to an idling speed of the internal combustion engine or is above the idling speed of the internal combustion engine, the third drive torque is also delivered to the output in addition to the first and second drive torque.

6. The method according to claim 1, wherein the further vehicle parameter is a specific accelerator pedal gradient or a specific accelerator pedal position.

7. A hybrid module in which the method according to claim 1 is used, wherein the hybrid module includes at least one of the first and second electric motor and includes the separating clutch.

8. A method of operating a hybrid powertrain, comprising:
in response to a vehicle speed being less than a threshold and an acceleration requirement not being present, propelling a vehicle with a second electric motor while a first electric motor and an internal combustion engine are decoupled from the second electric motor;
in response to the vehicle speed being less than the threshold and the acceleration requirement being present, closing a clutch to couple the first electric motor and the internal combustion engine to the second electric motor and propelling the vehicle with the first electric motor and the second electric motor while the internal combustion engine rotates but does not contribute torque; and
in response to the vehicle speed being greater than the threshold and the acceleration requirement being present, closing the clutch and propelling the vehicle with the first electric motor, the second electric motor, and the internal combustion engine in combination.

9. The method according to claim 8, wherein the acceleration requirement is present when a specific accelerator pedal gradient is exceeded.

10. The method according to claim 8, wherein the acceleration requirement is present when a specific accelerator pedal position is exceeded.

11. The method according to claim 8, wherein the acceleration requirement is present when a specific vehicle speed is exceeded, and a specific accelerator pedal gradient or specific accelerator pedal position is exceeded.

12. A hybrid module for a powertrain comprising:
a first electric motor having a first rotor adapted for fixation to a crankshaft of an internal combustion engine;
a second electric motor having a second rotor adapted to propel drive wheels of a vehicle;
a clutch selectively coupling the first rotor to the second rotor; and
control logic configured to
in response to a vehicle speed being less than a threshold and an acceleration requirement not being present, propel the drive wheels with the second electric motor while the clutch is disengaged,
in response to the vehicle speed being less than the threshold and the acceleration requirement being present, engage the clutch and propel the drive wheels with the first electric motor and the second electric motor while the internal combustion engine rotates but does not contribute torque, and
in response to the vehicle speed being greater than the threshold and the acceleration requirement being present, engage the clutch and propel the drive wheels with the first electric motor, the second electric motor, and the internal combustion engine in combination.

* * * * *